United States Patent [19]

Franaszek

[11] Patent Number: 4,845,706
[45] Date of Patent: Jul. 4, 1989

[54] SWITCH CONFIGURED NETWORK

[76] Inventor: Peter A. Franaszek, P. O. Box 218, Yorktown Heights, N.Y. 10598

[21] Appl. No.: 82,944

[22] Filed: Aug. 7, 1987

Related U.S. Application Data

[63] Continuation of Ser. No. 626,164, Jun. 29, 1984, abandoned.

[51] Int. Cl.$^4$ .............................. H04Q 11/04
[52] U.S. Cl. ........................ 370/62; 379/202
[58] Field of Search ............... 370/58, 29, 62; 379/158, 202, 204, 205, 206

[56]  References Cited

U.S. PATENT DOCUMENTS

| | | | |
|---|---|---|---|
| Re. 28,958 | 9/1976 | Zafiropulo et al. | 340/825.01 |
| 3,525,076 | 8/1970 | Keohane et al. | 340/825.79 |
| 3,614,328 | 10/1971 | McNaughton et al. | 179/18 BE |
| 3,637,947 | 1/1972 | Breen | 179/18 BE |
| 3,694,580 | 9/1972 | Inose | 370/58 |
| 3,924,077 | 12/1975 | Blakeslee | 370/29 |
| 4,020,290 | 4/1977 | Perna et al. | 370/58 |
| 4,038,638 | 7/1977 | Hwang | 340/825.08 |
| 4,191,941 | 3/1980 | Springer | 340/825.05 |
| 4,255,741 | 3/1981 | Peterson | 340/825.05 |
| 4,278,844 | 7/1981 | Jones | 179/18 BE |
| 4,322,843 | 3/1982 | Beuscher et al. | 370/58 |
| 4,393,497 | 7/1983 | Cantwell, Jr. | 340/825.05 |
| 4,417,242 | 9/1983 | Bapst | 370/86 |
| 4,445,212 | 4/1984 | Webber | 370/62 |

FOREIGN PATENT DOCUMENTS 56-48741  2/1981  Japan .

OTHER PUBLICATIONS

IBM Technical Disclosure Bulletin, "Pseudo-Switch for Physically Shared Networks", Favre, Pichon & Davan, vol. 19, No. 8, Jan. 1977, pp. 3082-3083.

Primary Examiner—Douglas W. Olms
Assistant Examiner—Frank M. Scutch, III

[57]  ABSTRACT

A switch configurable communication network among many users, comprising forwarding units which individually present a communication tree with their ports as terminal nodes and a cross-point switch for connecting one user to another, for connecting users to a forwarding unit and for connecting one forwarding unit to another, whereby the cross-point switch can configure two users in point-to-point communication and can form modular tree subnetworks among the users by using the forwarding units.

5 Claims, 5 Drawing Sheets

SWITCH CONFIGURED NETWORK

This is a continuation of application Ser. No. 626,164, filed June 29, 1984, now abandoned.

DESCRIPTION

1. Technical Field

This invention relates to switches for communication systems. In particular, it relates to a switching system which reconfigures a point-to-point communication system to subnetworks within the system.

2. Background of the Invention

A multi-user communication system must allow for communication or transmission of information from any user to any other user connected to the system. Present day communication systems are typically divided into two types, local networks and line switching systems. A local network involves a communication path that is shared by all the users. Such a shared communication path could be a bus or a ring. The bandwidth of the communication path is shared between the users and the path is time-division multiplexed to the requirements of the separate users. In the simplest case of a short bus, only a single user can transmit data onto the bus at any particular time. The other users must wait their time for access to the bus. Various protocols exist for assigning access to the bus to the various users.

An access token may be passed from user to user and only the user having the token is allowed access. Alternatively, the central controller may poll all the users to determine which users are currently requesting access to the shared path. Based upon the poll, the controller then assigns access to one of the users based upon one of several priority schemes. In a collision detection system, a user transmits onto the bus at will. A separate circuit is provided to determine if two users are simultaneously using the bus, that is, to detect a collision of message packets, and then to have the two users retransmit their messages without the possibility of collision.

A ring is a communication bus that closes upon itself to form a ring. The data flow is unidirectional and consists of packets of information transmitted from one user to the next user on the ring. Each user determines if the message should be retransmitted back onto the ring to yet further users. Because rings typically involve long transmission lengths, it is possible to have multiple message on different points of the ring at the same time. However, the bandwidth at any point of the ring is still shared between the users because any user must wait for a vacancy in the ring to transmit its own data.

Local networks suffer several disadvantages. The problem of shared bandwidth has already been discussed. The basic problem is that only one message can be on the network at any one time. Multiple parallel buses can be provided to increase the total bandwidth of the shared communication paths. Such a system is described in Japanese patent application No. 54-124551 for rings. However, such a system means that one user may be simultaneously receiving messages from two transmitting users so that additional buffering and timing controls are required. A very high speed bus can be used for increased bandwidth. However, such a high speed bus requires that every device attached to the device must be capable of operating at that bandwidth, even if its own data rates are considerably lower. In any case, the bandwidth of buses are limited to the technology available. Rings have the advantage of minimizing the effective bandwidth reduction due to propagation timers on a linear bus. However, a ring requires a fairly elaborate interface between the user and the ring. Universal protocols must be obeyed by all members of the ring. It appears necessary to always provide a centralized controller, or at least a master user, for a local network to either allocate access to the shared communication path or to insure that one malfunctioning user does not incapacitate the entire network.

The second type of communication system is line switching for point-to-point communication, best exemplified by a cross-point switch. If the system is full-duplex, each user has one input line and one output line connected to the cross-point switch. The cross-point switch can connect the communication lines of any user to any other user. Once the cross-points have been set, the two users are in direct communication. If m users are connected by a m×m full-duplex cross-point switch, m simultaneous connections can be made between various users. As a result, bandwidth is not shared between the users and the total bandwidth of the system is m times the bandwidth of the separate lines, 2 m for a full-duplex system. Line switching is very effective for the transmission of very long messages, as is evidenced by its common use in the telephone system. However, if there are a large number of short messages, the set-up time for the crosspoint and the propagation times can severely reduce the effective data rate of the system.

Thus it is seen that the local networks and line switching systems have different advantages and drawbacks, which are more and less important depending upon the type of user and the type of communication that the user is engaged in. If two groups of users predominantly communicate within their respective groups in short messages but occasionally have long messages to users in the other group, two rings or other networks can be set up for the two groups with switching provided between the groups. Such a system is disclosed by Inose et al. in U.S. Pat. No. 3,694,580 and by Favre et al in a technical article entitled "Pseudo-switch for Physically Shared Networks" appearing in the IBM Technical Disclosure Bulletin, volume 19, number 8, January 1977 at pages 3082-3089. Alternatively, multiple serial transmission lines may be connected into a single ring system, as disclosed by Bapst et al in U.S. Pat. No. 4,417,242.

A different approach is to use a distribution switch common to all users to set a ring that passes from user to user through the distribution switch. Such a system is described both by Peterson in U.S. Pat. No. 4,255,741 and by Cantwell in U.S. Pat. No. 4,393,497. Both these disclosures appear to allow for the addition and removal of users from the loop, but both are distinctly ring systems that suffer the drawback of a shared bandwidth despite the use of a distribution switch.

All of the described prior art involve relatively rigid communication systems, with fixed operational parameters. However, a communication system such as is required for a large computer has dynamically changing requirements depending upon the task currently being performed by the individual users. At one time, a user may be operating in relative isolation from the rest of the system. At other times, the user may need to send frequent short messages. At still other times, the user may be required to transmit large blocks of data to another user. Each of these states puts different demands upon the communication system and it is impossible to optimize the system for such widely varying requirements, particularly if the requirements are task specific.

SUMMARY OF THE INVENTION

Accordingly, it is an object of this invention to provide a communication system that can be optimized for both long messages and short messages.

It is a further object of this invention to provide a communication system that offers high bandwidth capacity and short connection times.

It is a further object of this invention to provide a communication that combines the advantages of a local network with a line switching system.

It is another object of this invention to provide a communication that is flexible to changing requirements of its users.

The invention can be summarized as a communication system comprising switching means, such as a cross-point switch, for selectively interconnecting multiple users. The invention further includes one or more forwarding units that are also selectively connected through the switch to the users. The forwarding units set up switching trees for the broadcast of information between all the users connected to the forwarding unit. The forwarding unit can have modular structure to allow the addition of further users to the tree broadcast system. Thereby, the users can either be line switched for point-to-point communication or can be connected to the forwarding unit to dynamically form local sub-networks.

DETAILED DESCRIPTION OF THE PREFERRED EMBODIMENTS

Figure 1:
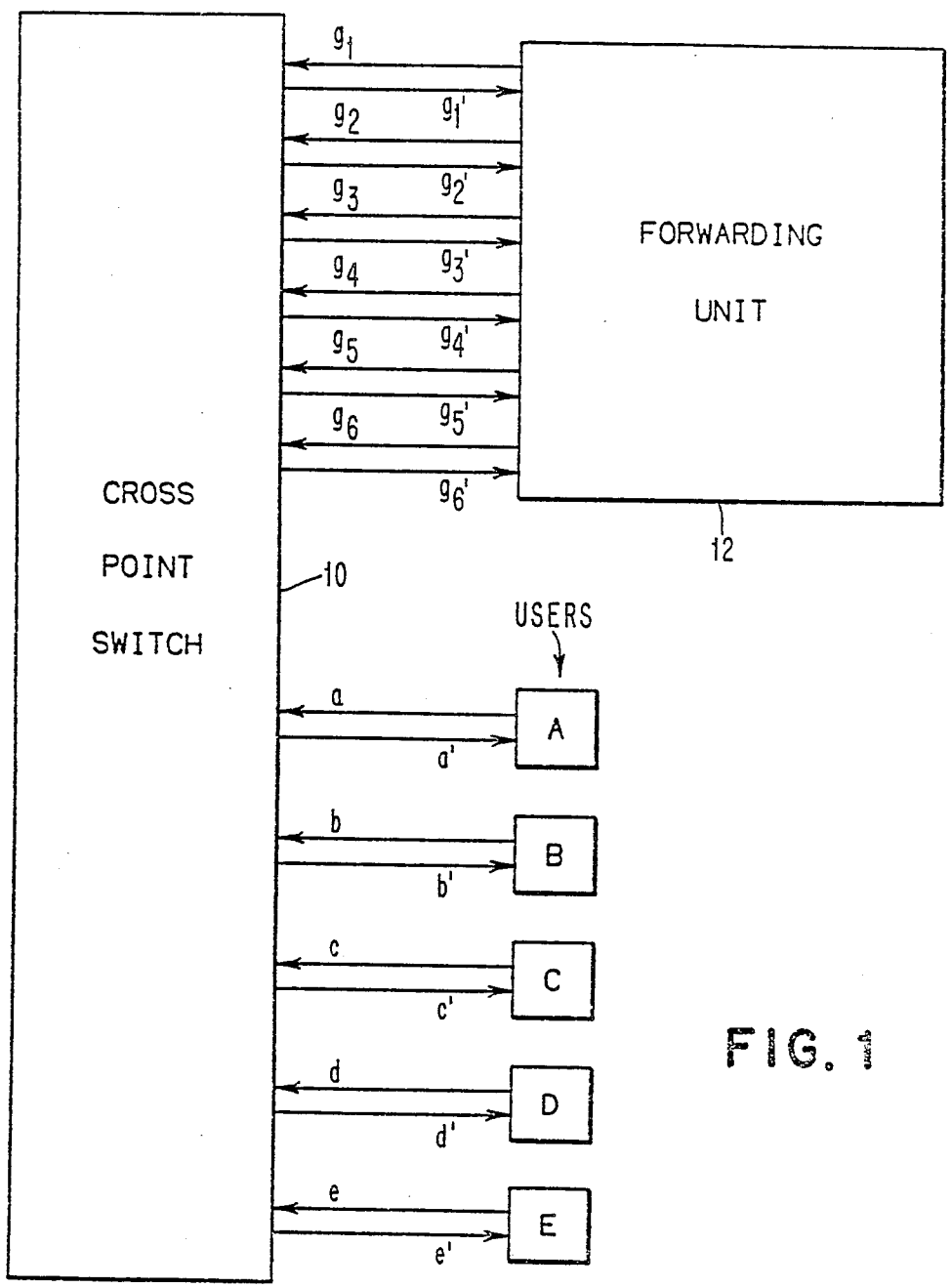
FIG. 1 is a block diagram of the switching system of the invention.

The design of the switch configured communication network of the present invention is schematically illustrated in FIG. 1. Five different user A, B, C, D and E are illustrated. Each user is connected to a cross-point switch 10 by a full-duplex communication link. For instance, user A transmits messages over serial output link a and receives messages over serial input link a'. Likewise, serial output links b, c, d and e and serial input links b', c', d', and e' are provided for the other respective user B, C, D and E. The cross-point switch 10 selectively interconnects any two of the users for point-to-point communication. Multiple point-to-point paths can be established through the cross-point switch 10. Although FIG. 1 implies that the cross-point switch 10 is a full-duplex one-sided switch, in fact, the switch can be two-sided and need not be full-duplex for the purposes of this invention. Cross-point switches and switching systems are well known and what has been described up to this point is conventional but suffers from the previously described drawbacks of line switching systems.

Figure 6:
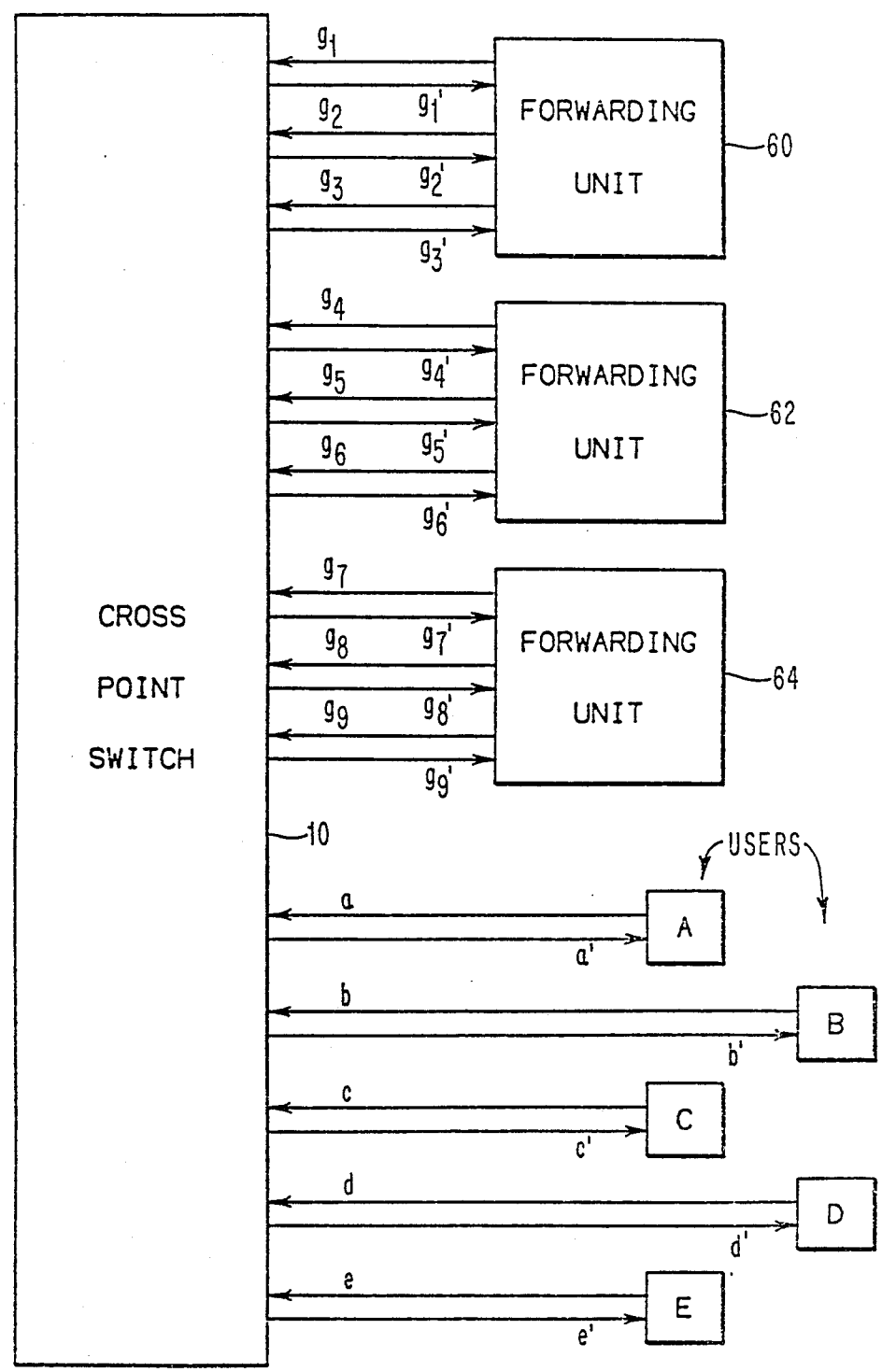
FIG. 6 is a block diagram of a modular embodiment of this invention.

However, the invention further includes a forwarding unit 12 which is linked to the cross-point switch 10 by a number of full-duplex links. The links consists of pairs of input and output links, $g_1$, $g_1'$, $g_2$, $g_2'$, etc. FIG. 6 illustrates six duplex links between the forwarding unit 12 and the cross-point switch 10. The cross-point switch 10 treats the links to the forwarding unit 12 in the same manner as the links to the users A–E. That is, the cross-point switch 10 can not only interconnect the duplex links to the users A–E but can also connect a user link to any of the duplex links to the forwarding unit 12. Furthermore, the cross-point switch 10 can connect two links to the forwarding unit 12, for example, connecting $g_1$ and $g_1'$ to $g_2$ and $g_2'$. Any number of the links from the forwarding unit 12 may at a particular time be somehow connected through the cross-point switch. However, in the embodiments to be described, the cross-point switch 10 does not provide fan-in and fan-out so that only non-branching paths through the cross-point switch 10 are provided.

The purpose of the forwarding unit 12 is to set up tree communication networks among the users A–E. The form of the tree system is determined by the connections of the links through the cross-point switch 10.

Figure 2:
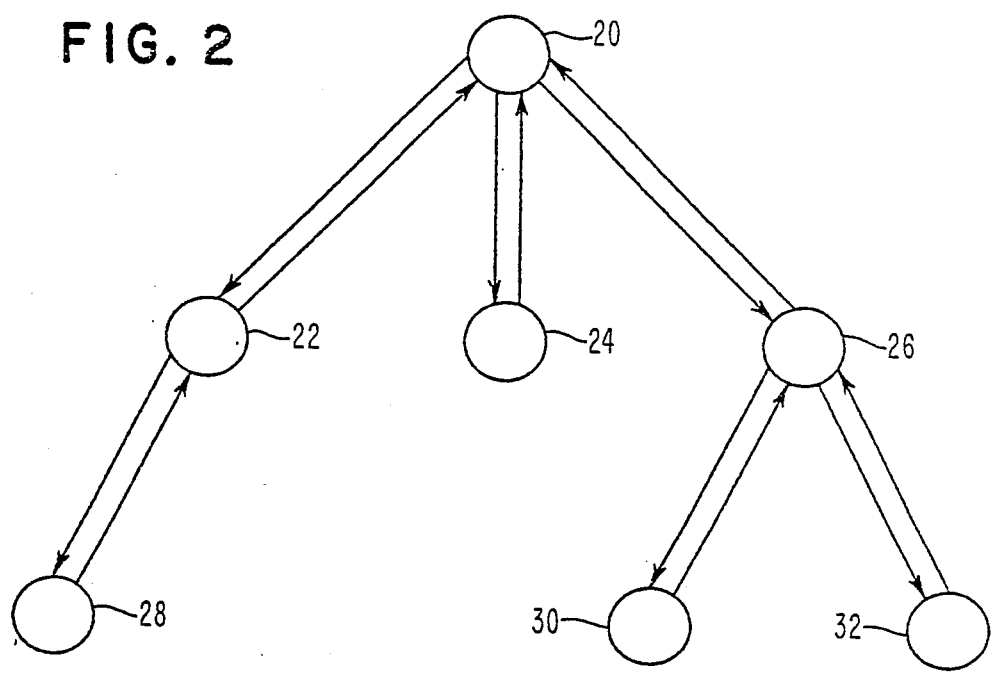
FIG. 2 is a schematic diagram of a bi-directional tree communication system.

A tree communication system is defined as a system in which there are multiple nodes and that one and only one communication path exist between any one node and any other node within the system. A bi-directional tree is illustrated in FIG. 2, in which there are seven nodes 20, 22, 24, 26, 28, 30 and 32. The general tree structure is described in an article by the inventor entitled, "Address Independent Routing in Local Networks" appearing in the IBM Journal of Research and Development in September 1983. The nodes are linked by pairs of uni-directional lines forming bi-directional links. It is seen in the illustrated structure that every node can communicate with every other node, possibly through one or more intermediate nodes. However, additional links, such as between nodes 28 and 30 or between nodes 20 and 30 would violate the tree structure. Terminal nodes 24, 28, 30 and 32 are at the end of the tree and have only a single input line and a single output line while the intermediate nodes 20, 22 and 26 have two or more input links and output links of equal number. In the broadcast mode, whenever a node transmits a message, every other node receives the message. Thus the intermediate nodes 20, 22 and 26 must forward all messages that they have received. In order that messages not be continuously retransmitted, the terminal nodes 24, 28, 30 and 32 do not forward any messages but only transmit their own messages.

An access token can be used to control access to the tree system. The token is transferred from one terminal node currently holding the token to another specific terminal node. The identification of the terminal node about to gain the token must accompany the token since all nodes receive the token message but only the identified node is granted the token.

There are two types of operation of the illustrated bi-directional tree of FIG. 2 of interest for this invention. In type II operation, all messages are transmitted up to a root node 20 which then retransmits the message down to all the other nodes. Type II opearation has two disadvantages. Each node must know where the root node 20 is located in order to differentiate messages being sent from a terminal node up to the root node 20 from messages being sent down from the root node 20 to the terminal nodes. For instance, if the terminal node 32 originates a message, in the transmission to the root node 20 the intermediate node 26 forwards the message to the root node 20 but not toward the other terminal node 30. However, when the root node 20 has retransmitted or forwarded the message, the intermediate node 26 forwards the message to both terminal nodes 30 and 32. Another disadvantage is obvious from the previous description, that is, some intermediate nodes receive the message twice and the originating terminal node receives back its own message.

In type III operation, each node forwards a received message in every direction except in the direction from which the message was received. This rule encompasses the terminal nodes as well. In type III operation, therefore, each node operates with the same protocol, regardless of whether it is a terminal, an intermediate or a root node, which really has no meaning in type III operation. This flexibility more easily allows the modular assembly of a tree, as will be described later. It is also seen that in type III operation duplicate messages are not passed through any of the nodes of the tree. Also, as will be described later, type III nodes are easily fabricated with simple circuitry.

Figure 3:
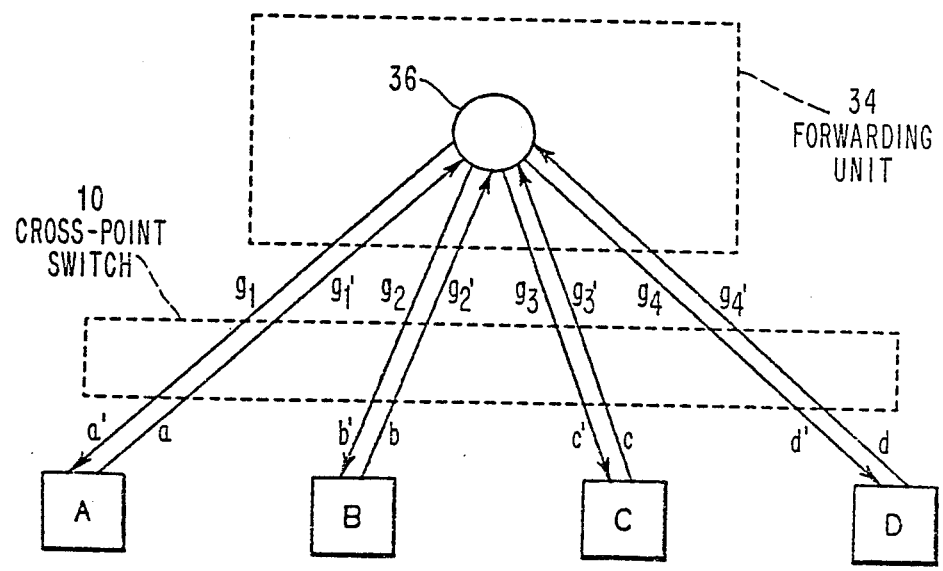
FIG. 3 is a block diagram of an embodiment of the switching system of this invention.

One of the simplest embodiments of the invention is illustrated in FIG. 3 in which a forwarding unit 34 consists of a single node 36, which will be called a super node because it is directly connected to all the links entering the forwarding unit 34. If the users A, B and C wish to to be connected together in a tree subnetwork, the cross-point switch 10 is instructed to connect the user links to links to the forwarding unit 34, for instance a' is connected with $g_1$, a with $g_1'$, b' with $g_2$, etc. The forwarding unit 34 is statically configured so that any of its links are connected to the super node 36. As a result, the cross-point switch 10 and the forwarding unit 34 form a communication tree with the users A, B and C as terminal nodes. Although it would be possible for only two users to be connected to the forwarding unit 34, such a configuration is unnecessary because two users could more easily be directly connected through the cross-point switch 10.

The tree subnetwork is not limited to the users A, B and C. If instead the users A, B and D wish to form a subnetwork, the switch 10 could have connected user D instead of user C onto the links $g_3$ and $g_3'$ to the forwarding unit 34. It is also possible that the super node 36 can operate with unused links $g_4$ and $g_4'$. Then if the users A, B and C have already formed a subnetwork, user D could join the subnetwork by having the cross-point switch 10 connect its links d and d' to unused links $g_4'$ and $g_4$ of the forwarding unit 34. It is to be understood that, at the same time that the illustrated users are forming the subnetworks through the forwarding unit 34, additional users may be in point-to-point communication through the same cross-point switch 10. Thus as the requirements of the individual user dynamically change, a user may be in point-to-point communication with one other user or may alternatively create a subnetwork or join an already existing subnetwork of multiple users.

The switching system of this invention can advantageously be controlled by control messages sent by the users to the cross-point switch on the same lines that are subsequently used for data transmission through the switch. Such a type of control by a message header is disclosed by Springer et al in U.S. Pat. No. 4,191,941.

Figure 4:
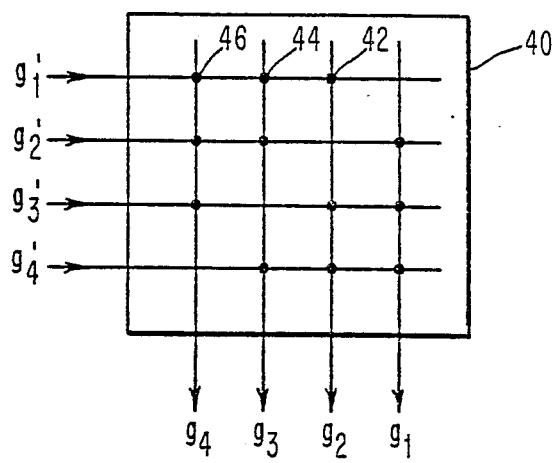
FIG. 4 is a schematic diagram of a cross-point switch usable as a node in this invention.

The forwarding unit 34 can be implemented with a cross-point switch 40, shown in FIG. 4, having fan-out. The cross-point switch 40 has four input lines $g_1'-g_4'$ and four output lines $g_1-g_4$. Each input line is associated with an output line as a full-duplex link as illustrated in FIG. 3. For example, $g_1'$ is associated with $g_1$. The cross-point switch 40 has the potential of coupling the signals on any input line onto any and possibly all output lines. However, the connections are made such that an input line is coupled to all the output lines except the one to which it is associated. For example, the input line $g_1'$ is coupled only onto the output lines $g_2$, $g_3$ and $g_4$ with cross-points 42, 44 and 46. All the required cross-points are illustrated in FIG. 4. It is important that the cross-points couple signals from the input lines to the output lines but not vice versa. This can be accomplished passively with diodes or actively by amplifiers. As a result of the configuration of cross-points shown in FIG. 4, an incoming signal is forwarded in all directions except in the direction from which the signal came.

Although multiple layers of cross-point switches have been used for telephone systems, such as disclosed by Hwang in U.S. Pat. No. 4,038,638, these have been used for point-to-point communication rather than networks and do not provide a statically configured cross-point switch similar to a forwarding unit. Typically, also, a communication path must pass through all layers rather than avoiding the forwarding units for simple connections.

Figure 5:
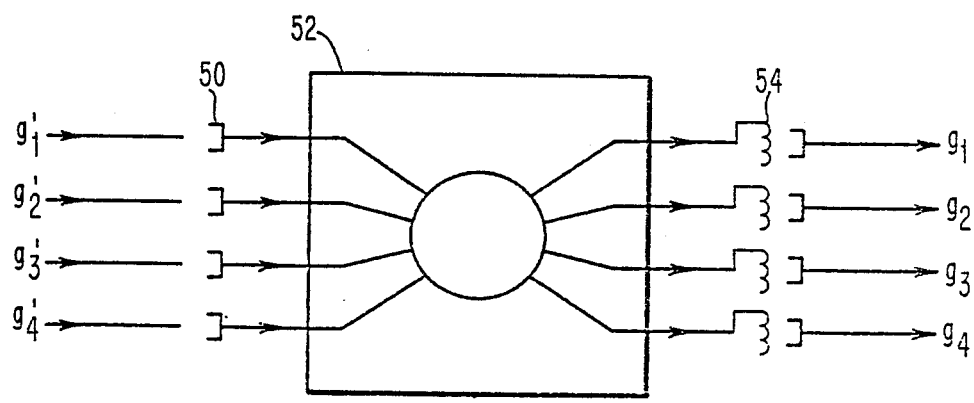
FIG. 5 is an optical switch, functionally equivalent to FIG. 4.

The forwarding unit can also be realized optically, which is important because serial links are likely to be in the form of fiber optics. Such an optical forwarding unit is illustrated in FIG. 5 and consists of detectors 50 receiving the optical signals on the individual optical input lines $g_1'-g_4'$. The optical signals are directed into an optical routing function 52 and by means of optical components such as beam splitters and mirrors, an input signal is coupled onto all the output lines except for the one output line associated with the input line. The output signals are then transmitted by optical emitters 54 onto the optical output links $g_1-g_4$.

With the super node forwarding unit 34 of FIG. 3, it is theoretically possible to satisfy any switching system. However, there are several disadvantages of the super node approach. First of all, it is envisioned that several hundred users are attached to the system. If all the users are to join the subnetwork, the size of the node, of which FIGS. 4 and 5 provide examples, must correspond to this very large number of users, even though typically only a few users are forming a subnetwork. The forwarding unit, as a result, becomes unnecessarily large and complex. Furthermore, if one input to a super node is driving a very large number of outputs there is a fan-out problem. Digital electronics are typically designed so that one driver can drive a fairly small number of outputs, for example five outputs which would be a fan-out of 5. If the fan-out exceeds this number, additional layers of drivers must be provided. Beyond the obvious complexity of multiple layers of drivers, each layer introduces its own time delay.

Thus, a large super node is both complex and slow. Furthermore, with a large number of users, the users are likely to want to form multiple subnetworks. Additional subnetworks can be provided by attaching additional forwarding units 34 to the cross-point switch 10. However, if each super node is designed to accommodate the maximum number of users, there results a great overdesign. Therefore, the present invention can be advantageously used with forwarding units that are modular in design so that they can be used either separately to form multiple simple networks or they can be combined into larger subnetworks.

A modular design for a switch configured network is illustrated in FIG. 6 in which the cross-point switch 10 is connected to users A, B, C, D and E by the previously described full-duplex links a, a', b, b' etc. Three equivalent forwarding units 60, 62 and 64 are provided, each with three input links and three output links. Five users and three forwarding units are chosen just for sake of an example. The forwarding units 60, 62 and 64 can be used by means of the cross-point switch 10 to form subnetworks of the users A-E. The forwarding units 60-64 are themselves statically configured and the communication paths through them are determined by their input and output links.

Figure 7:
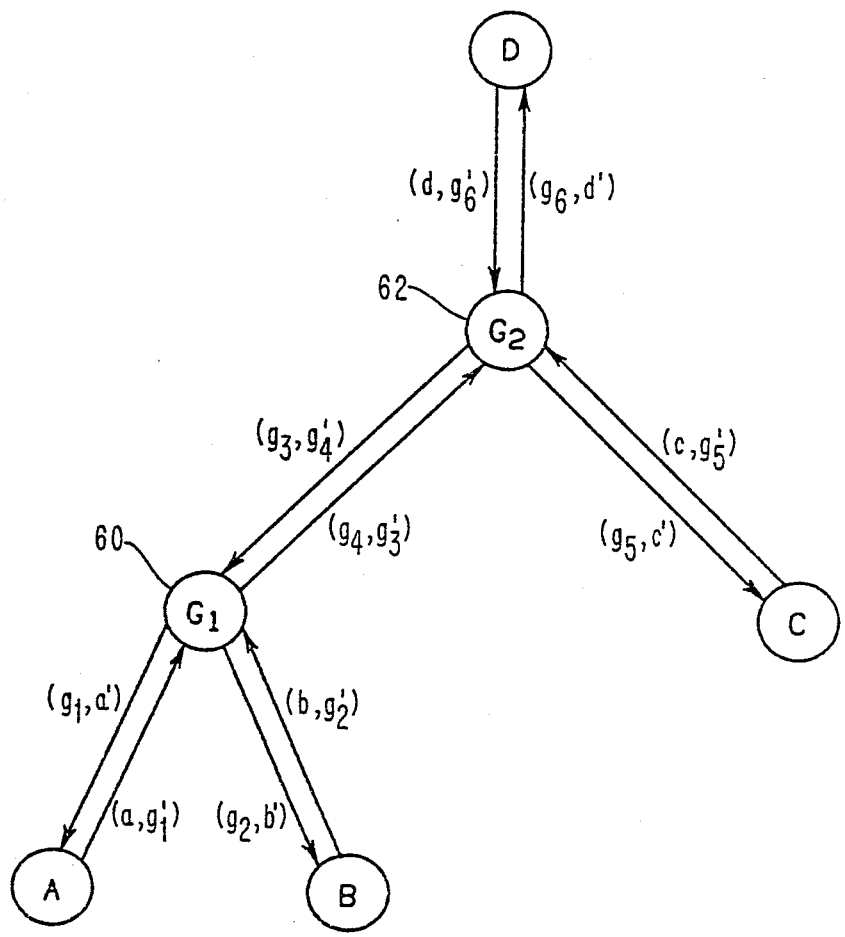
FIG. 7 is a schematic diagram of a tree communications systems wherein each forwarding unit has its own tree structure.

Users A, B and C can form a subnetwork if the users A and B are joined to a node $G_1$ in forwarding unit 60 and the forwarding unit 60 and the user C are joined to a node $G_2$ in the forwarding unit 62, as illustrated for the resultant tree structure in FIG. 7. It should be further noted that the users A and B could have first formed their own subnetwork using the forwarding unit 60 and then the second node $G_2$ could have been subsequently established by the user C without disturbing the already existing subnetwork between the users A and B. Furthermore, the user D could join the subnetwork of users A, B and C by being connected to the forwarding unit 62. Alternatively, the subnetwork could be extended further by connecting the forwarding unit 64 to the forwarding unit 62 already in the subnetwork. The size of the subnetwork is only limited by the number of forwarding units and their fan-out capability, which is directly related to the number of links into the forwarding unit. Of course, the forwarding units 60 and 62 could be separately used to form two subnetworks with a maximum of three users attached to each. Thus the modular switching unit of FIG. 6 provides for growth and flexibility in the subnetworks between the users. Of course, as previously mentioned, at the same time that the forwarding units 60-64 are being used to form subnetworks, the users A-E can be joined in point-to-point communication directly through the cross-point switch 10.

The use of additional forwarding units results in multi-layered structure for the forwarding units. Additional layers can be added to the tree structure as additional users require access to the subnetwork. Furthermore, separate subnetworks can be set up which subsequently can be joined into a larger subnetwork for communication between the two previous subnetworks. The larger subnetwork can then be broken back down into its two component subnetworks when the inter-subnetwork communication is no longer required. Favre et al, in the previously cited article, disclose cross-point switches at nodes that can set up either intra-network or inter-network links. However, they require a controllable cross-point switch at each configurable node.

It should be obvious that the individual forwarding units may have a more complex structure than a super node. Each forwarding unit may have its own tree structure, for instance as illustrated in FIG. 7, with the intermediate nodes $G_1$ and $G_2$ being formed in a single forwarding unit.

Although the communication switch previously described has envisioned the use of a cross-point switch with a fan-out of one so that the cross-point switch connects one input link to only one output link, such a restriction is not necessary for the invention. If the cross-point switch can provide fan-out, such a cross-point switch can act as one or more intermediate nodes connecting three or more users or forwarding units. Such a structure is consistent with the tree architecture. The forwarding units are nonetheless useful in conjunction with a cross-point switch with fan-out because of their ability to form a modular subnetwork and because of the typically limited fan-out available with fast, compact electronics. Furthermore, other types of switches besides cross-point switches can be used with the invention as long as they are consistent with the tree architecture.

Having thus described my invention, what I claim as new, and desire to secure by Letters Patent is:

1. A switch configurable digital data communication network for a plurality of users, comprising:
    a cross point switch having a plurality of ports for selectively connecting said ports of said cross point switch in pairs such that any two of said ports can be selectively connected together regardless of existing connections of all others of said ports;
    a plurality of forwarding units having a plurality of ports for selectively connecting selected ones of said ports of said forwarding units in a tree-type network in which each port of said forwarding units forms a node, bidirectional message links connecting said nodes in pairs in a hierarchy in which one and only one bidirectional communication path exists between any one node and any other node, each of said message links carrying messages only between the pair of nodes which it connects; and
    a plurality of further bidirectional message links, a first set of said further message links being connected between respective ones of a first set of said ports of said cross point switch and said ports of said forwarding units, and a second set of said further message links being connected between respective ones of a second set of said ports of said cross point switch and said users,
    wherein pairs of said users can selectively be connected directly through said cross point switch, and three or more of said users can selectively be connected in a tree-type network by said at least one forwarding unit via said cross point switch.

2. The switch configurable communication network of claim 1, wherein at least one of said forwarding units comprises a selectively configurable communication tree network having multiple nodes linked by a plurality of subpaths, one and only one combination of one or more subpaths linking any two of said nodes, one of said nodes being a terminal node linked by only one of said subpaths in said tree.

3. The switch configurable communication network of claim 1, wherein said message links each comprises a unidirectional input link and a unidirectional output link.

4. The switch configurable communication network of claim 1, wherein each said forwarding unit comprises means for forwarding from an input one of said ports of said forwarding unit a message to plural ones of said ports of said forwarding unit.

5. A switch configurable digital data communication network for a plurality of users, comprising:

switching means having a plurality of ports for selectively connecting said ports of said switching means in pairs such that any two of said ports can be selectively connected together;

at least one forwarding unit having a plurality of ports for selectively connecting selected ones of said ports of said forwarding unit in a tree-type network in which each port forms a node, bidirectoional message links connecting said nodes in pairs in a hierarchy in which one and only one bidirectional communication path exists between any one node and any other node, each of said messsage links carrying messages only between the pair of nodes which it connects; and a plurality of further bidirectional message links, a first set of said further message links being connected between respective ones of a first set of said ports of said switching means and said ports of said at least one forwarding unit, and a second set of said further message links being connected between respective ones of a second set of said ports of said switching means and said users, wherein pairs of said users can selectively be connected directly through said switching means, and three or more of said users can selectively be connected in a tree-type network by said at least one forwarding unit via said switching means.

* * * * *